Patented Jan. 19, 1937

2,068,321

UNITED STATES PATENT OFFICE 2,068,321

BENZOYL BENZOIC ACID COMPOUNDS AND PROCESS FOR PRODUCING THE SAME

Ivan Gubelmann, Wilmington, Del., and John M. Tinker, Penns Grove, N. J., assignors to E. I. du Pont de Nemours & Company, Wilmington, Del., a corporation of Delaware No Drawing. Application June 27, 1935, Serial No. 28,668

4 Claims. (Cl. 260—64)

This invention relates to the preparation of new 2-benzoyl-benzoic acid derivatives and more particularly to the preparation of 4'-halogeno-3'-cyano-2-benzoyl-benzoic acids, which we have found to be valuable intermediates for the preparation of dyestuffs.

It is an object of the present invention to provide a simple and economical method for the preparation of 4'-halogeno-3'-cyano-2-benzoyl-benzoic acid which may be readily converted to the corresponding carboxylic acid and ring-closed to give the 2-halogeno-anthraquinone-3-carboxylic acid.

It is a further object of this invention to provide 4'-halogeno-3'-cyano-2-benzoyl-benzoic acid and its halogen substitution products as new compounds.

According to this invention, 4'-halogeno-3'-amino-2-benzoyl-benzoic acid is diazotized and the diazo compound is treated with copper cyanide to form the nitrile, as is more fully described in the following example, in which the parts used are by weight.

Example 69 parts of 4'-chloro-3'-amino-2-benzoyl-benzoic acid are dissolved in 500 parts of water and the sodium salt formed with 10 parts of caustic soda. 20 parts of sodium nitrite are added and the solution diazotized by running onto 130 parts of 20° Bé. hydrochloric acid and ice. After stirring for ½ hour, the excess acidity is neutralized with caustic soda to weak acid test on Congo red. The cold diazo solution is then poured onto a solution of 50 parts of copper cyanide and 50 parts of sodium cyanide in 500 parts of water at 10–20° C. After stirring for some time the free carboxylic acid is formed by adding an excess of hydrochloric acid and filtered and washed. Copper is removed by dissolving in an excess of sodium carbonate solution, filtering, and the sodium salt of the 4'-chloro-3'-cyano-2-benzoyl-benzoic acid is then precipitated with salt. On acidification with mineral acid, 55 parts of the free acid are precipitated. The pure nitrile melts at 193.2° C. and analyzes 4.88% N (4.90% N theory) and 12.40% Cl. (theory 12.43% Cl.).

40 parts of the 4'-chloro-3'-cyano-2-benzoyl-benzoic acid as prepared in the above example may be boiled with 400 parts of water and 25 parts of caustic soda to hydrolyze the cyano compounds to the corresponding carboxylic acid. On acidification, the 4'-chloro-3'-carboxy-2-benzoyl-benzoic acid is precipitated in quantitative yield.

In a similar manner the fluorine or bromine compounds may also be prepared. Substituted phthalic anhydrides containing halogen in the 3, 4, 5 or 6 position may be used to give substituted halogeno-cyano compounds. Any of the general methods known for carrying out the Sandmeyer reaction to the nitrile may be employed in this process, for instance, copper sulfate and sodium or potassium cyanide may be used in place of the copper cyanide mentioned in the specific example above. The cyano group may be hydrolyzed directly to the carboxylic acid without isolating the nitrile.

Having thus described our invention, what we claim is:

1. In the process for preparing 4'-halogeno-3'-carboxy-2-benzoyl-benzoic acid, the steps which comprise diazotizing a 3'-amino-4'-halogeno-2-benzoyl-benzoic acid, reacting the diazo compound with an alkali-metal cyanide and a copper salt to produce the corresponding 4'-halogeno-3'-cyano-2-benzoyl-benzoic acid, and hydrolyzing the cyanogen compound so formed by means of caustic alkali to the 4'-halogeno-3'-carboxy-2-benzoyl-benzoic acid.

2. The process which comprises diazotizing a 3'-amino-4'-halogeno-2-benzoyl-benzoic acid, reacting the diazo compound with an alkali-metal cyanide and a copper salt, and isolating the 4'-halogeno-3'-cyano-2-benzoyl-benzoic acid so formed.

3. A compound of the class consisting of 4'-halogeno-3'-cyano-2-benzoyl-benzoic acid and its halogen substitution products, wherein the halogen is present in at least one of the positions 3, 4, 5 and 6.

4. 4'-chloro-3'-cyano-2-benzoyl-benzoic acid.

IVAN GUBELMANN.
JOHN M. TINKER.